United States Patent [19]
Morimoto

[11] Patent Number: 5,168,374
[45] Date of Patent: Dec. 1, 1992

[54] PICTURE DATA ENCODING CIRCUIT WITH COMPRESSION RESPONSIVE TO THE AMOUNT OF STORED DATA

[75] Inventor: Eiichi Morimoto, Kyoto, Japan

[73] Assignee: Murata Kikai Kabushiki Kaisha, Kyoto, Japan

[21] Appl. No.: 704,617

[22] Filed: May 23, 1991

[30] Foreign Application Priority Data

May 28, 1990 [JP] Japan ................... 2-137659

[51] Int. Cl.$^5$ ............................. G06K 9/00
[52] U.S. Cl. ..................... 358/426; 358/404; 382/56
[58] Field of Search ............. 358/426, 427, 404, 444, 358/261.4; 382/56

[56] References Cited

U.S. PATENT DOCUMENTS

| | | | |
|---|---|---|---|
| 3,524,926 | 8/1970 | Starr et al. | 358/426 |
| 4,602,353 | 7/1986 | Komori | 382/56 |
| 4,937,681 | 6/1990 | Fujinawa et al. | 358/426 |
| 4,982,292 | 1/1991 | Itoh et al. | 358/426 |
| 5,105,284 | 4/1992 | Sakata et al. | 358/404 |

FOREIGN PATENT DOCUMENTS

| | | | |
|---|---|---|---|
| 0143681 | 9/1982 | Japan | 358/444 |
| 0176364 | 9/1985 | Japan | 358/404 |

*Primary Examiner*—Edward L. Coles, Sr.
*Assistant Examiner*—Jill Jackson
*Attorney, Agent, or Firm*—Spensley Horn Jubas & Lubitz

[57] ABSTRACT

A picture data encoding circuit is constituted by a picture data buffer part storing the read picture data temporarily, an encoding circuit part for encoding the picture data per one line, a picture memory device part storing the encoded picture data, a picture data contracting part for decoding the encoded picture data as before and contracting it, a contracted picture data buffer part storing the contracted picture data temporarily, a signal switching part for signal transmissions of each part, and a signal processing part for processing signals of each part. One encoding circuit part is used in common in the reading of picture data and the data sending.

9 Claims, 3 Drawing Sheets

PICTURE DATA ENCODING CIRCUIT WITH COMPRESSION RESPONSIVE TO THE AMOUNT OF STORED DATA

FIELD OF THE INVENTION

The present invention relates to improvement of a picture data encoding circuit being used in a facsimile or the like.

DESCRIPTION OF THE PRIOR ART

Recently, facsimiles are widely used and many types of those which are provided with various kinds of additional functions have come into existence. Some facsimiles have been developed, where parallel processing is performed in that picture data of a transmitted draft is stored in a picture memory device. Thereafter, while the stored picture data is being sent to telephone lines, the picture data of the subsequent transmitted draft are stored simultaneously in another picture memory device, so that the transmission time is shortened.

In such a facsimile, a picture memory device having a storage capacity of picture data for at least one page is required, but a constitution of reducing a storage capacity by encoding and compressing the picture data being read is made, on account of high costs of memory devices. Then, in the encoding systems of picture data, MR encoding system comparing picture data of one read line from the sent draft with picture data of one read line just before it and encoding the differentiation portion, and MH encoding system performing the sequential encoding only by picture data for one read line etc. have been adopted. However, both encoding systems are not able to be interrupted until the encoding of a sent draft for one page has been finished, once the encoding has been initiated.

Further, for example, in case the sent draft is of the B4 size, i.e. the width of the document is 2048 picture elements, and the form size of the facsimile device being destined is of the A4 size i.e. the width of the document is 1728 picture elements, the picture data is transmitted automatically with contraction on the transmitting side, but, as encoded picture data stored in the picture memory device can not be contracted directly, the encoded picture data is put back to the original picture data by once being decoded, and then the picture data decoded is contracted and sent to lines after being encoded again.

Additionally, in a facsimile having only one encoding circuit, it is not possible to send data to the line while picture data is being read and it is not possible to read the picture data of the sent draft while the data is being sent to the line. Thus reading action of the picture data and the sending action of the data to the line can be switched only for one page of the draft which will be sent. Thereafter the shortening of the transmission time cannot be accomplished because simultaneous parallel processing is impossible.

Therefore, there is some facsimile which is provided with an encoding circuit part exclusively for reading out the picture data and an encoding circuit part exclusively for sending the data to the lines respectively, and performs the reading-out of the picture data and the sending of the data to the lines simultaneously so as to shorten the transmission time. Such a facsimile is desired to be improved against the increasing cost caused by the provision with each exclusive encoding circuit, notwithstanding that the encoding, decoding and compressing speeds of the picture data are very high in comparison to the reading speed of the picture data of the transmitted draft and the sending speed of the picture data to the lines.

OBJECT AND SUMMARY OF THE INVENTION

In view of the above-mentioned circumstances, an object of the present invention is to provide a picture data encoding circuit where an encoding circuit for encoding the sent draft for each line is switched and used for the reading of the picture data and the sending of the data to the line, thereby the transmission time can be shortened by one encoding circuit part and the cost saving can be done.

In order to attain the above object, a picture data encoding circuit of the present invention comprises a picture data buffer part for storing temporarily the read picture data, an encoding circuit part for encoding the picture data per one line, a picture memory device part for storing the encoded picture data, a picture data contracting part for decoding the encoded picture data as before and contracting it, a contracted picture data buffer part for storing the contracted picture data temporarily, a signal switching part for switching signal transmissions of the above-mentioned parts, and a signal processing part for processing signals of each part.

In the present invention, when the signal switching part has been switched and connected to the condition in which the picture data would be encoded by the control of the signal processing part, picture data read from each line are stored in the picture data buffer part temporarily and the stored picture data are encoded for each line in the encoding circuit part and the encoded picture data are stored sequentially in the picture memory device part.

Further, when a signal switching part is switched and connected to the condition in which data sending to lines is carried out due to the control of a signal processing part, if picture data are transmitted intact without contraction to a transmission destination, encoded picture data stored in picture memory devices will be sent intact to the lines. On the other hand, if contracted picture are transmitted, encoded picture data stored in the picture memory part will be decoded in every line to the original picture data and then contracted at the picture data contraction part, and the contracted picture data are stored temporarily in the contracted picture data buffer part, and then the stored contracted picture data are encoded in every line in the encoding circuit part and sent to transmission lines.

Thus, one encoding circuit part is used in common in the reading of picture data and the sending of data to the transmission line, and the signal processing part watches the quantity of picture data stored in the picture memory device and the data sent state to the transmission line in the signal processing part and performs the changing control properly.

The above and other advantages of the invention will become more apparent in the following description and the accompanying drawings.

DESCRIPTION OF THE PREFERRED EMBODIMENTS

Embodiments of the present invention will be explained referring to the accompanying drawings as follows.

Figure 1:
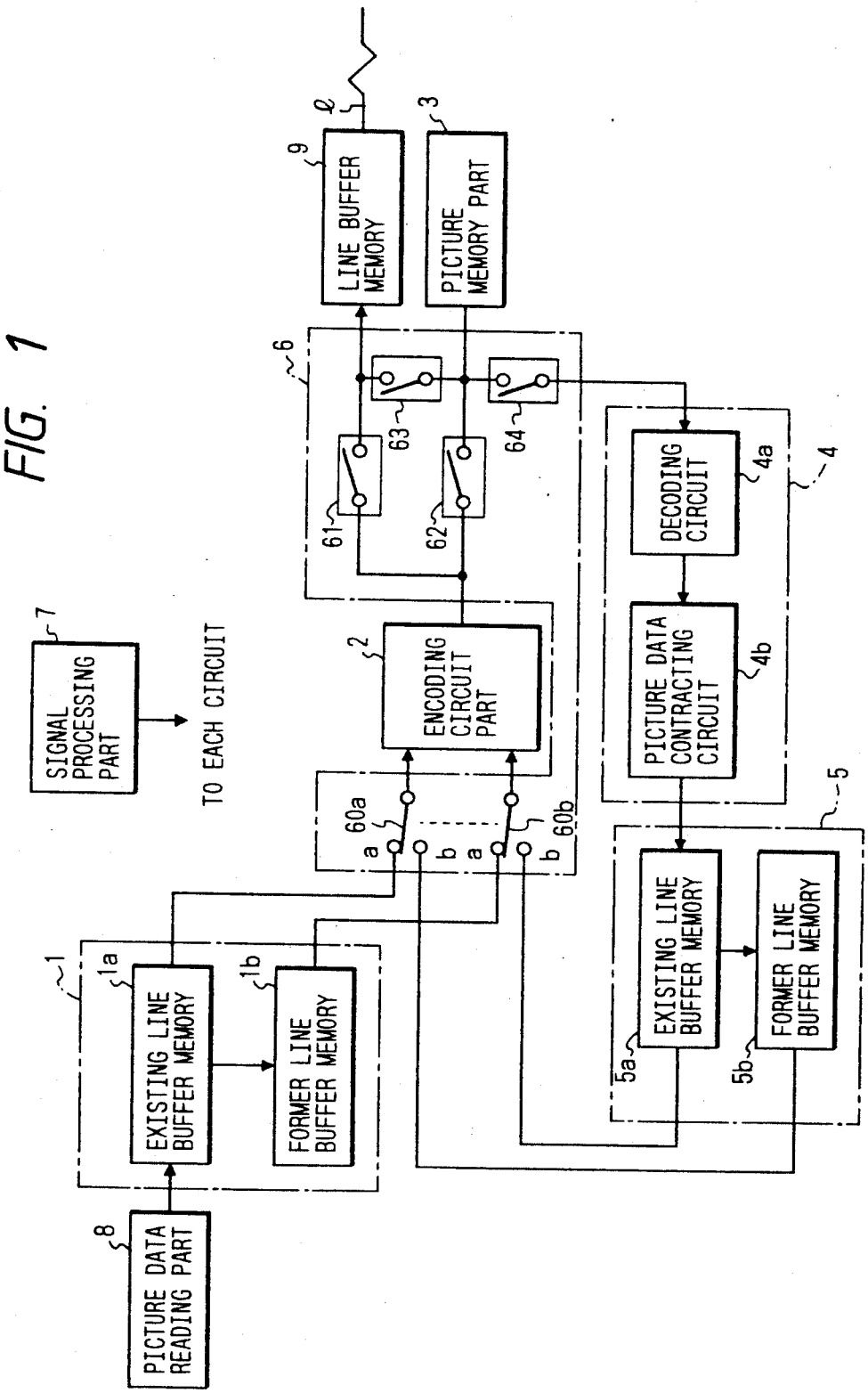
FIG. 1 is a block diagram showing constitution of main part of the invention.

FIG. 1 shows the constitution of main part of the invention in a block diagram. In FIG. 1, a picture data encoding circuit comprises a picture data buffer part 1 for storing temporarily the read picture data of every line, an encoding circuit part 2 for encoding the picture data of every line, a picture memory part 3 for storing the encoded picture data, a picture data contracting part 4 for decoding the encoded picture data stored in the picture memory part 3 to the original picture data and then contracting the decoded picture data, a contracted picture data buffer part 5 for storing temporarily the contracted picture data of every line, and a signal switching part 6 for switching the signal transmission of each part. Further, the picture data encoding circuit comprises a picture data reading part 8 for reading the draft to be transmitted in every line and for converting the read draft into picture data, and a line buffer memory device 9 for storing temporarily the sent data in order to send data to a telephone line 1. Additionally, the encoded picture data stored in the picture memory part 3 and the picture data stored in the line buffer memory device 9 are always watched by a signal processing part 7. The signal switching part 6 is controlled by the signal processing part 7 according to data storage amount in both memories. By switching from the picture data reading to data sending the signal processings can be performed more efficiently.

The picture data buffer part 1 has an existing line buffer 1a and a former line buffer memory device 1b, and the picture data for one line read by means of the picture data reading part 8 is stored in the existing line buffer memory 1a, and on the picture data for next one line being read, after the picture data stored in the existing line buffer memory device 1a is transferred to the former line buffer memory device 1b, the action storing the read data in the existing line buffer memory device 1a is carried out sequentially.

The picture data contracting part 4 is provided with a decoding circuit 4a and a picture data contracting circuit 4b, and the encoded picture data for one line transmitted from the picture memory device part 3 are once decoded to the original picture data by the decoding circuit 4a, and then the decoded picture data are contracted by the picture data contracting circuit 4b.

The contracted picture data buffer part 5 has an existing line buffer memory buffer memory device 5a and a former line buffer memory device 5b, and the contracted picture data for one line transmitted from the picture data contracting part 4 are stored in the existing line buffer memory device 5a, and on the contracted picture data for next one line being transmitted, after the contracted picture data stored in the existing line buffer memory device 5a are transferred to the former line buffer memory device 5b, the action storing the transmitted contracted picture data in the existing line buffer is carried out sequentially.

Further, the signal switching part 6 is provided with changeover switches 60a, 60b having switching contacts a and b and performing interlocking operation, and switches 61-64. These changeover switches are changed by the control of the signal processing part 7. Besides, these changeover switches and switches are constituted using semiconductor elements in this embodiment.

The operation of the picture data encoding circuit in the present invention having such a constitution will be explained referring to the flow charts of FIG. 2 and FIG. 3. Moreover, prior to the sending of picture data, in the facsimile, the format size data are sent are received with the transmission destination by hand shake, and decision is performed as to whether the contraction of the picture data is necessary or not. Therefore, the explanation is divided into two cases, i.e., the one without contraction of data and the other with contraction.

1. Operation in the case of sending picture data as it is without contraction to the telephone line (see FIG. 2)

① The changeover switches 60a, b of the signal switching part 6 are connected to the side of the changeover contact a and the switch 62 is closed by the signal processing part 7.

Figure 2:
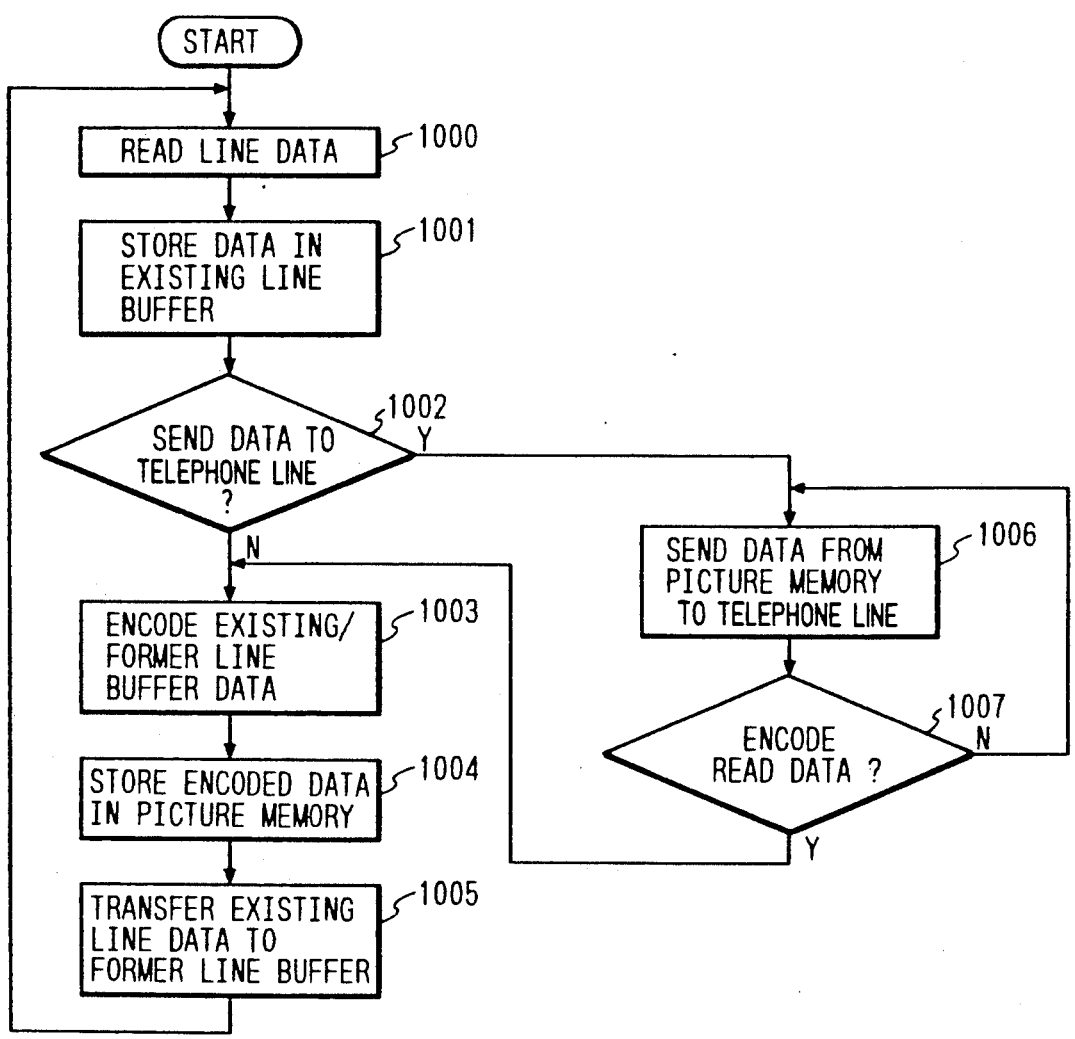
FIG. 2 is a flow chart explaining the operation when transmission is carried out without contracting the picture data.

② The picture data for one line of the sent draft is read by the picture data reading part 8, and stored in the existing line buffer memory 1a of the picture data buffer part 1 (FIG. 2, steps 1000, 1001).

③ In this condition, since data to be sent to the telephone line buffer memory device 9 has not been stored, encoding of the picture data is initiated. In the encoding circuit part 2, the picture data housed in the existing line buffer memory device 1a are compared with the picture data housed in the former line buffer memory device 1b (all blank data wound appear as the picture data has not been stored in the buffer memory device 1b at reading the first line of every page of the transmitted draft), and the encoding (MR encoding) is carried out for the difference between them (see FIG. 2, steps 1002, 1003).

④ The encoded image data outputted from the encoding circuit part 2 is transmitted through the switch 62 to the picture memory device 3 and stored (see FIG. 2, step 1004).

⑤ The picture data for one line stored in the existing line buffer memory device 1a of the picture data buffer part 1 are transferred to the former line buffer memory device 1b (see FIG. 2, step 1005).

The above operations ②-⑤ are repeated, and the encoded picture data are sequentially stored in the picture memory part 3. Thus, if the storage of the picture data in the picture memory part 3 becomes full during encoding of the picture data of the sent drafts, the signal processing part 7 discriminates and changing to the data sending to telephone line is performed by following operation.

① The switch 62 of the signal switching part 6 is opened and the switch 63 is closed by the control of the signal processing part 7.

② The encoded picture data stored in the picture memory part 3 are transferred through the switch 63 to the telephone line buffer memory device 9, and the encoded picture data are sent from the telephone line buffer memory 9 to the telephone line 1 (see FIG. 2, step 1006).

Further, if the storage of the picture data in the picture memory part 3 decreases in the middle of the data sending to the telephone line 1, as the encoding of the picture data is restored by the discrimination of the signal processing part 7, the switch 63 of the signal switching part 6 is opened and the switch 62 is closed, and the operation is started again from the encoding of the picture data stored in the picture data buffer part 1 (see FIG. 2, step 1007, step 1003).

2. Operation in the case of the picture data being contracted and sent to the telephone line (see FIG. 3)

As the operation of encoding the read picture data (FIG. 3, steps 1000–1005) is the same as that indicated in steps 1000–1005 of the flow chart of FIG. 2, the explanation shall be omitted with the same code attached.

① If the storage of the picture data in the picture memory part 3 becomes full during encoding of the picture data, the signal processing part 7 discriminates and changing to the data sending to the telephone line 1 is performed. Therefore, the changeover switches 60a, b of the signal switching part 6 are changed and connected to the side of the changeover contact b, and the switches 61, 64 are closed.

Figure 3:
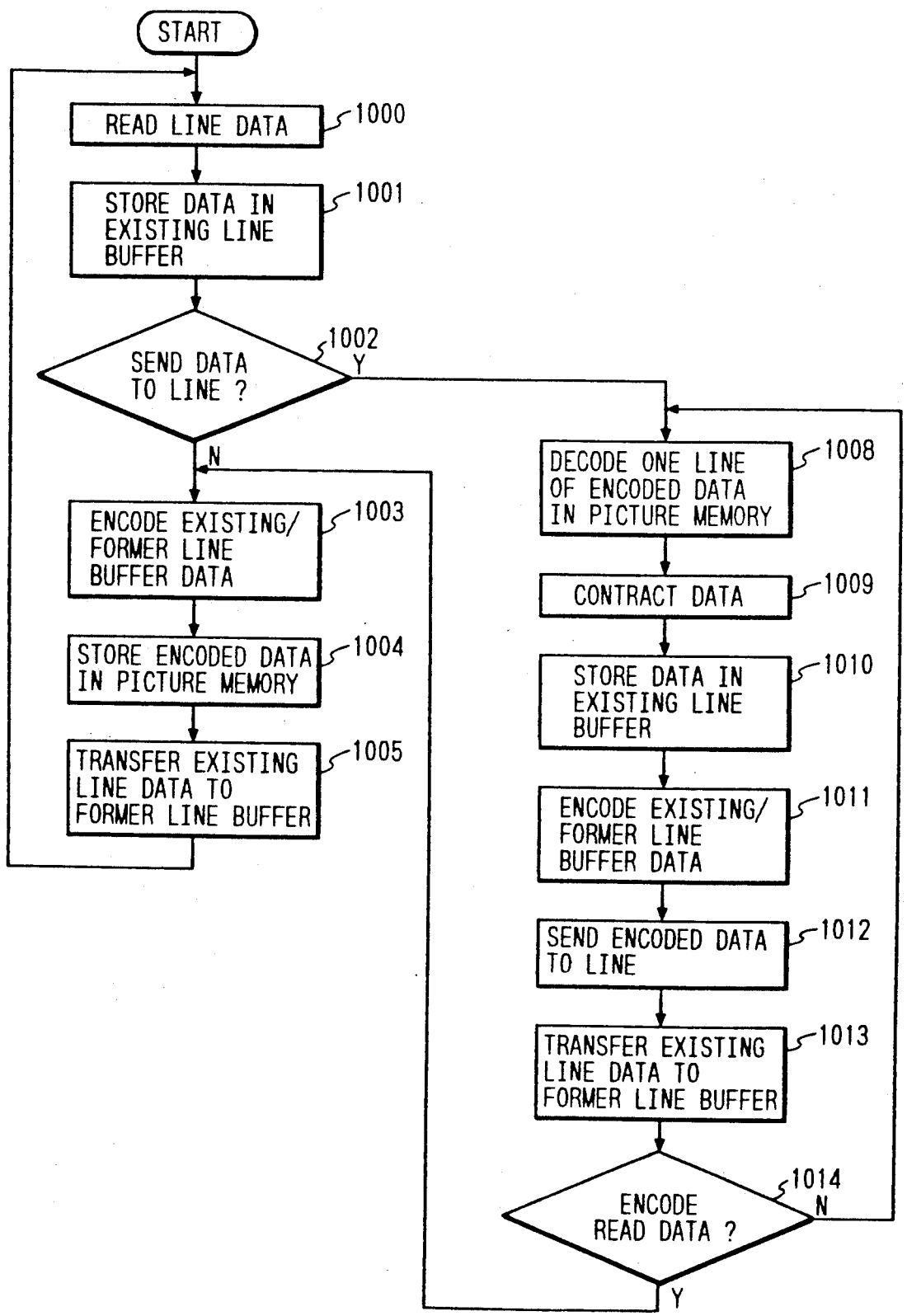
FIG. 3 is a flow chart explaining the operation when the picture data are contracted and transmitted.

② The encoded picture data for one line stored in the picture memory part 3 are transmitted through the switch 64 to the picture data contracting part 4 and then decoded to the original picture data by the decoding circuit 4a, and the decoded picture data are contracted by the picture data contracting circuit 4b (see FIG. 3, steps 1008, 1009). Further, the encoded picture data have the data bits of one line different from that of the original picture data, but the end of one line of the encoded picture data is detected by counting the number of data bits of the decoded picture data being outputted from the decoding circuit 4a in this embodiment.

③ The contracted picture data for one line contracted by the picture data 4 are stored in the existing line buffer memory device 5a of the contracted picture data buffer part 5 (see FIG. 3, step 1010).

④ In the encoding circuit part 2, the contracted picture data being housed in the existing line buffer memory device 5a are compared with the contracted picture data being housed in the former line buffer memory device 5b (as contracted picture data has not been stored in the former line buffer memory device 1b during reading of the first line of every page of the sent drafts, fully blank data would take place), and the encoding (MR encoding) for the difference between them is carried out (see FIG. 3, step 1011).

⑤ The contracted picture data being encoded are transmitted through the switch 61 to the telephone line buffer memory device 9 and then sent from the telephone line buffer memory device 9 to the telephone line 1 (see FIG. 3, step 1012).

⑥ The contracted picture data being stored in the existing line buffer memory device 5a of the contracted picture data buffer part 5 are transferred to the former line memory device 5b (see FIG. 3, step 1013).

⑦ The above operations 2–6 (FIG. 3, steps 1008–1013) are carried out repeatedly, thereby the contracted picture data being encoded are sequentially sent to the telephone line 1.

Further, if the data stored in the picture memory part 3 decrease during sending the data to the telephone line 1, as the signal processing part 7 discriminates and changing to the encoding of the picture data is performed, the switches 61, 64 of the signal switching part 6 are opened and the switch 62 is closed, and the operation is started again from the encoding of the picture data stored in the picture data buffer part 1 (see FIG. 3, step 1014, step 1003).

As mentioned above, in the present invention, the signal processing part 7 always watches the picture data quantity stored in the picture memory part 3 and the telephone line buffer memory device 9, and reading of the picture data and data sending are conveniently changed, in one line as a minimum unit, according to the stored data quantity. Therefore, only by the encoding circuit part 2 being equipped, the transmission time can be shortened and the cost can be reduced in the same way as in the case in which two exclusive encoding circuits are equipped and perform the parallel processing.

Further, although the above description has been made in the case of performing the MR encoding system, the invention can be applied not only to such encoding system but only the MH encoding system to perform encoding only by the existing line data. Also the invention can be applied to a facsimile of G3 mode in which MH encoding and MR encoding are carried out alternately.

According to the present invention,[1] as the operation of the encoding of read picture data and the sending of data to the telephone line can be performed by changing of one encoding circuit, a picture data encoding circuit can be provided which enables shortening of the transmission time and reduction of the cost.

What is claimed is:

1. In a device comprising a picture data reader and a line buffer memory, the line buffer memory operably connected to a telephone line, a picture data encoding circuit for encoding picture data read by the reader comprising:

picture data buffer means for temporarily storing the picture data read by the reader;

encoding circuit means for encoding the picture data;

picture memory means for storing the encoded picture data;

picture data compression means for decoding the encoded picture data and for compressing the decoded data;

compressed picture data buffer means for temporarily storing the compressed picture data;

signal switching means for operably connecting at least two of the line buffer memory, the picture data buffer means, the encoding circuit means, the picture memory means, the picture data compression means, and the compressed picture buffer means; and signal processing means for monitoring the picture memory means and for adjusting the signal switching means when a predetermined amount of data is stored in the picture memory means;

wherein compressed picture data is encoded by the encoding circuit means before reaching the line buffer memory.

2. A picture data encoding circuit as set forth in claim 1, wherein the picture data compression means comprises a decoding circuit and a picture data contracting circuit.

3. A picture data encoding circuit as set forth in claim 1, wherein the signal switching means comprises semiconductor elements.

4. In a device comprising a picture data reader and a line buffer memory, the line buffer memory operably connected to a telephone line, a picture data encoding circuit for encoding picture data read by the reader comprising:

picture data buffer means for temporarily storing the picture data rad by the reader;

encoding circuit means for encoding the picture data;

picture memory means for storing the encoded picture data;

picture data compression means for decoding the encoded picture data and for compressing the decoded data;

compressed picture data buffer means for temporarily storing the compressed picture data;

signal switching means for operably connecting at least two of the line buffer memory, the picture data buffer means, the encoding circuit means, the picture memory means, the picture data compression means, and the compressed picture data buffer means; and signal processing means for monitoring the picture memory means and for adjusting the signal switching means when a predetermined amount of data is stored in the picture memory means;

wherein the picture data buffer means comprises an existing line buffer memory device and a former line buffer memory device.

5. In a device comprising a picture data reader and a line buffer memory, the line buffer memory operably connected to a telephone line, a picture data encoding circuit for encoding picture data read by the reader comprising:

picture data buffer means for temporarily storing the picture data read by the reader;

encoding circuit means for encoding the picture data;

picture memory means for storing the encoded picture data;

picture data compression means for decoding the encoded picture data and for compressing the decoded data;

compressed picture data buffer means for temporarily storing the compressed picture data;

signal switching means for operably connecting at least two of the line buffer memory, the picture data buffer means, the encoding circuit means, the picture memory means, the picture data compression means, and the compressed picture data buffer means; and signal processing means for monitoring the picture memory means and for adjusting the signal switching means when a predetermined amount of data is stored in the picture memory means;

wherein the compressed picture data buffer means comprises an existing line buffer memory device and a former line buffer memory device.

6. A method of encoding data in a device comprising a line buffer memory, a picture memory, a picture data compressor, an encoding circuit, and a signal processor, the method comprising the steps of:

reading picture data;

directing the picture data through the encoding circuit;

storing the encoded picture data in the picture memory; and operably connecting the picture memory, the picture data compressor, the encoding circuit and the line buffer memory when a predetermined amount of encoded data is stored in the picture memory.

7. The method of claim 6 further comprising the steps of:

compressing the stored picture data;

directing the stored picture data through the encoding device; and directing the compressed and encoded picture data to the line buffer memory.

8. The method of claim 7, wherein the step of compressing the stored picture data comprises the step of decoding the picture data prior to compressing the picture data.

9. A method of encoding data in a device comprising a line buffer memory, a picture memory, a picture data compressor, an encoding circuit, and a signal processor, the method comprising the steps of:

reading picture data;

directing the picture data through the encoding circuit;

storing the encoding picture data in the picture memory; and operably connecting the picture memory and the line buffer memory when a predetermined amount of encoded data is stored in the picture memory.

* * * * *